Aug. 5, 1958 — E. F. HISCOCK — 2,845,797
WIND VELOCITY AND WIND DIRECTION INDICATOR
Filed Sept. 26, 1955 — 2 Sheets-Sheet 1
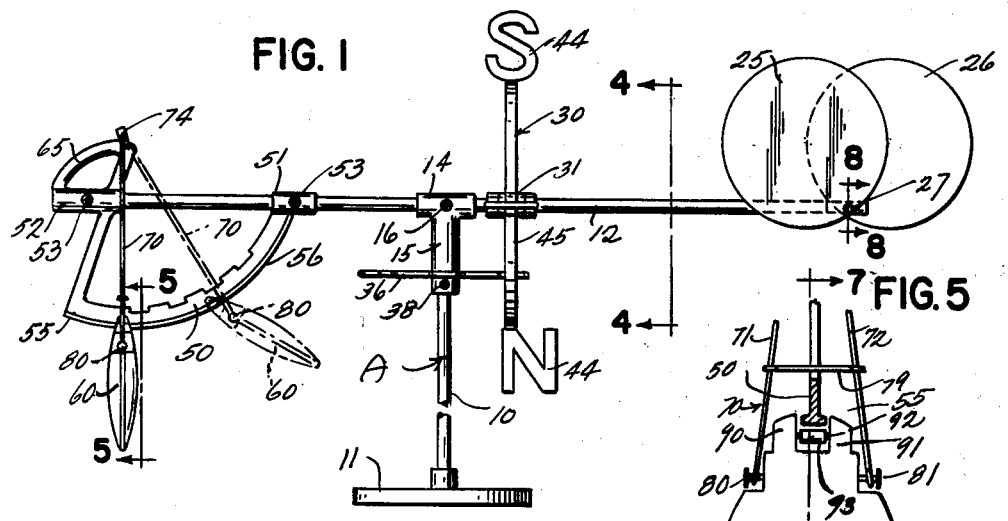
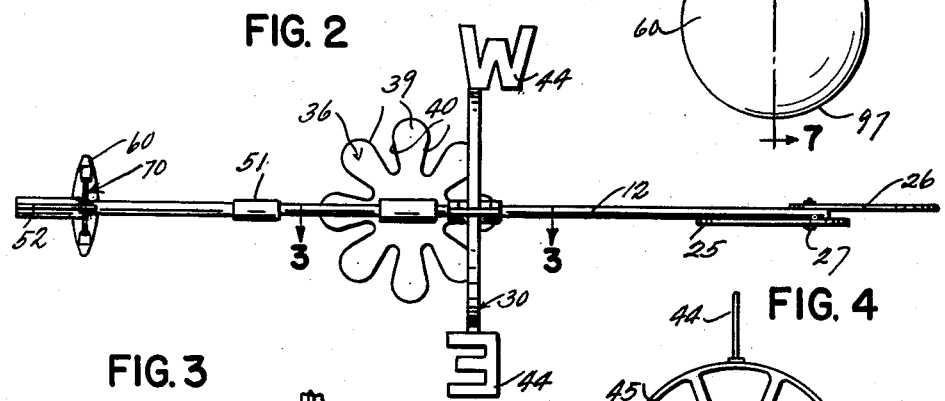
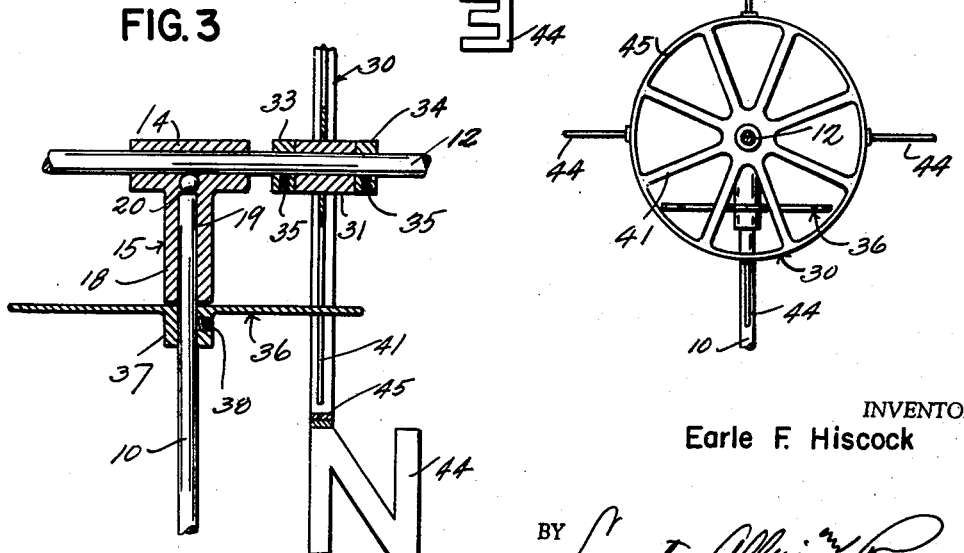
INVENTOR
Earle F. Hiscock
BY *Lancaster, Allwine and Rommel*
ATTORNEYS

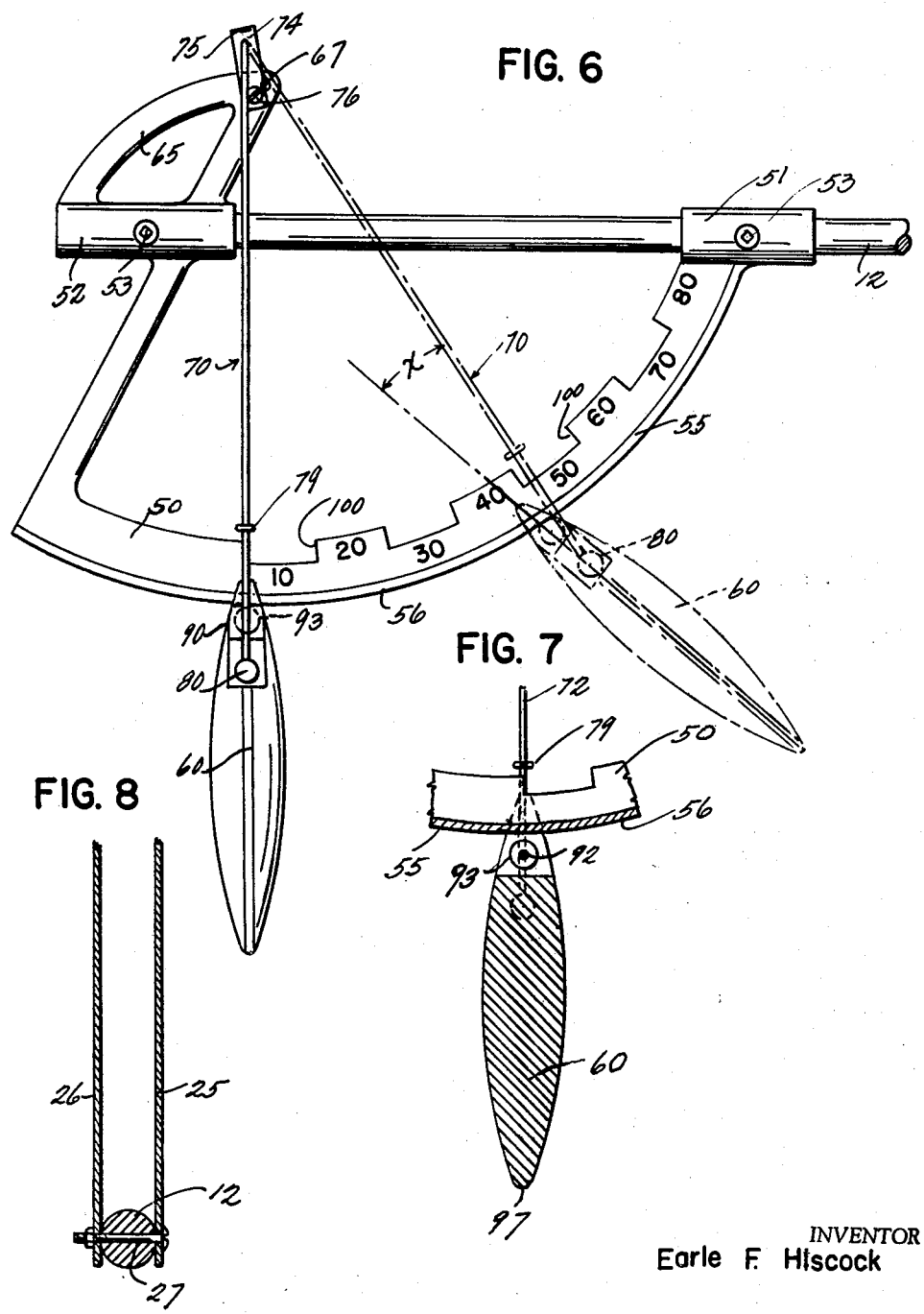

United States Patent Office 2,845,797
Patented Aug. 5, 1958

2,845,797

WIND VELOCITY AND WIND DIRECTION INDICATOR

Earle F. Hiscock, Chatham, Mass.

Application September 26, 1955, Serial No. 536,705

9 Claims. (Cl. 73—189)

This invention relates to improvements in instruments for determining wind velocities and direction of wind travel.

The primary object of this invention is the provision of a relatively simple instrument having improved means for accurately measuring wind velocities, whether the same be light breezes or of gale strength, coupled with wind direction indicating means.

Known wind and flow indicators are not very accurate in measuring both low velocity flow as well as high velocity flow of winds and liquids. To that end I have provided a velocity indicator which is of such nature that it will visually indicate low velocity travel as well as high velocity travel, and which will not oscillate erratically during wind gusts or eddies.

A further object of this invention is the provision of a pendulum type wind velocity indicator having improved means to prevent oscillation of the same during wind gusts.

A further object of this invention is the provision of a wind velocity instrument having a compound wind actuated pendulum for accurately indicating wind velocities over a wide range.

A further object of this invention is the provision of a demountable wind velocity and directional indicator, the parts of which are assembled for knock-down purposes, and which can be readily assembled and dis-assembled by unskilled persons.

A further object of this invention is the provision of an improved velocity and directional indicator for testing winds, fluids and liquids, the velocities and wind direction being readily visible because of the unique structural arrangement of the parts thereof.

Other objects and advantages of the invention will be apparent during the course of the following detailed description.

In the accompanying drawings, forming a part of this specification, and wherein similar reference characters designate corresponding parts throughout the several views:

Figure 1 is a fragmentary side elevation of the improved velocity and directional indicator.

Figure 2 is a plan view of the improved indicator.

Figure 3 is a vertical cross sectional view taken through certain structural features of the improved indicator, substantially on the line 3—3 of Figure 2.

Figure 4 is a fragmentary cross sectional view taken through certain details of the indicator substantially on the line 4—4 of Figure 1.

Figure 5 is an enlarged view, partly in section, taken substantially on the line 5—5 of Figure 1.

Figure 6 is an enlarged side elevation of the velocity indicator of the instrument.

Figure 7 is a cross sectional view taken through the pendulum and cam structure of the instrument substantially on the line 7—7 of Figure 5.

Figure 8 is a fragmentary cross sectional view taken through the vane structure of the instrument substantially on the line 8—8 of Figure 1.

In the drawings, wherein for the purpose of illustration is shown only a preferred embodiment of the improved wind velocity and directional indicator, the letter A may generally designate the instrument. It includes as parts thereof a velocity indicating assemblage and a directional indicating assemblage, having common frame structure.

The instrument preferably includes a supporting standard 10 which may have a base 11 of any other approved construction for the mounting thereof. The standard 10 is non-rotatable and at its top supports a horizontal frame 12, in the shape of a rod or bar, secured detachably within the passageway of the head 14 of a coupling T 15, by means of a set screw 16. The vertical portion 18 of the T has a passageway 19 receiving the upper end of the standard 10. A ball bearing 20 is preferably located in the T at the top of the passageway 19 to serve as a bearing for rotation of the T upon the top edge of standard 10. This facilitates free and easy swinging of the frame bar 12 in a horizontal plane upon the shaft 10 as an axis.

The horizontal bar 12 at one side of the standard 10 is preferably provided with vanes 25 and 26 secured as by a bolt or pin 27, in detachable manner, at the extreme end of the bar 12. These discs are frictionally clamped in order that they may be moved on the bolt 27 as a pivot to different positions for varying the lateral resistance area of the same. The vanes 25 and 26 are shown as circular discs. One side of each may be provided with highly reflective material and the other covered with some opaque material, such as black paint.

Referring to the directional characteristics of the instrument, I preferably provide an index wheel 30 having a hub 31 with a passageway through which the frame rod 12 extends. This wheel is rotatable upon the rod 12 and held in place by shallow sleeves 33 and 34 which are keyed to the shaft 12 by means of set screws 35 (see Fig. 3). Thus, the wheel 30 may be adjusted endwise along the shaft 12, and after having been adjusted the same cannot move endwise but only rotate upon the bar or rod 12. A drive wheel or gear 36 is keyed upon the shaft 10. Its hub 37 is detachably keyed as by set screw 38 upon the shaft 10. The wheel 36 is provided with eight spokes 39; the spaces 40 therebetween being eight in number and comprising V-shaped recesses which receive therein the eight spokes 41 of the index wheel 30. The proper adjustment of the spokes of the wheel 30 with respect to the teeth of the drive wheel 36 is effected by adjusting the position of the wheel 30 along the supporting shaft 12 and adjusting the position of the spoke wheel 36 along the standard 10. The inter-meshing of the teeth and spokes of the wheels 30 and 36 is such that there is no appreciable back lash during rotation of the frame rod 12 as a result of gust pressures.

The index letters "N," "E," "S" and "W," designated by numeral 44, are very pronounced in size and located on the rim 45 of wheel 30, as by detachable set screws or bolts; the planes of these index letters being at right angles to the plane of the wheel 30. Thus, the letters are quite visible. The top letter of course designates the wind direction.

Referring to the velocity indicating features of the instrument, the frame bar or rod 12 at the opposite side of the standard 10 from the vane assemblage is provided with a cam segment or sector 50 having at the ends thereof a pair of sleeves 51 and 52 which receive the rod 12 therethrough. These sleeves are held upon the shaft against rotation and against endwise movement by set screws 53. The sector 50 depends in a vertical position below the rod 12 at the extreme end of said rod opposite the vanes. Sector 50 is provided with a flanged peripheral trackway 55, the outer surface 56 of which acts as a cam for controlling a wind actuated pendulum 60, as will be more fully described hereinafter. The sleeve 52 is provided with an upstanding supporting bracket 65. The center 67 from which the cam arc is struck is shown in Figure 6. The pendulum 60 is preferably carried by a lever type of frame 70 consisting of a pair of wires or rods 71 and 72 which at their bight ends are pivoted at 74 upon a position adjustable piece 75. The latter may be secured at 76 upon the frame 65. The supporting wires or rods 71 and 72 may be braced at their lower ends by a cross piece 79 immediately above the segment 50. The wires 71 and 72 straddle the segment 50 and at their lower ends they are provided with eyes for rotatably receiving thereon headed pins 80 and 81 of the pendulum 60. The pivot locations 80 and 81 lie below the cam edge 56 and the pendulum 60 itself depends below the segment 50. The pendulum 60 is provided with a pair of fixed upstanding ears 90 and 91, shown in Figure 5, which support, above the pendulum body, a cross pin 92 upon which a roller sleeve 93 is rotatably mounted for engaging the cam surface 56 for purposes to be subsequently described.

The pendulum 60 is substantially egg shaped in plan, that is, in the direction of wind travel, and in vertical cross section it is oval, with both sides convexed in a rather uniform taper from the ends to a location approximately the middle of the height, where the same is thickest (see Fig. 7). It is preferably constructed of balsa wood or light plastic foam which can be moulded easily and inexpensively. This shape produces a pendulum having an air foil effect. Both sides have the same convexed curvature. Thus the uppermost surface under the influence of wind travel will, when the pendulum is horizontally positioned, at maximum wind velocity, equal the drag of the lower convexed surface. This form of pendulum gives lateral stability. It will be noted that the effective center of pressure of the pendulum is below the axis in which the suspension locations 80 and 81 lie. Streamlining of the surfacing of the pendulum prevents unfavorable wind eddies which would likely cause erratic functioning.

It will be noted that pivot location 74 of the pendulum supporting frame 70 lies above and rearwardly of the pivot location 67, from which the cam surface 56 is struck. Thus, as wind pressure causes the pendulum 60 to move, angling of the supporting frame 70 will bring the pendulum anti-friction roller sleeve 93 into engagement with the track surfacing 56, causing the pendulum to tilt forwardly in the direction of wind travel for changing the angle thereof with respect to the plane of the frame 70. Normally, with the pendulum hanging limp, the roller 93 is spaced from the cam edge 56, as shown in Figure 7. This enables the pendulum to swing, without much resistance in slight breezes or zephyrs, to indicate their velocities. As the pressure of winds increase the pendulum 60 and its supporting frame 70 will move until the roller 93 engages the cam edge 56. This forwardly tilts the pendulum body in the direction of wind travel. This angling of the pendulum 60 with respect to the line of the frame 70 is designated by the angle X in Figure 6 of the drawing. This angle progressively increases with an increase in wind velocity.

The tilting means for the pendulum has been provided in order to accentuate reduction in the area surface of the pendulum presented to the wind more rapidly, so as to approach the actual increase in wind pressure as wind velocity increases. In other words, the tilting effect forces the pendulum to such position and thereby presents less surface area to the wind.

For purposes of easy visibility the sector 50 may be notched, as indicated at 100; these notches being of sufficient length to properly designate the wind velocities in miles per hour, as shown in Figure 6. Thus, the notch closest to the direction from which the wind is coming has an index mark (10) designating 10 miles per hour, the tooth between this notch and the next notch has a marking (20) designating 20 miles per hour. This may continue throughout the length of the segment 55 to any desired reading. Ordinarily instruments of this sort will be located at some high spot, so that the notched out edging of the cam surface silhouetted against the sky will facilitate reading of wind velocities.

It will be noted that the pendulum supporting piece 75 may be adjusted by means of the screw or bolt 76 so as to properly space the centers 67 and 74, and also to properly space the peripheral edging of the roller 93 with respect to the cam surface 56, to give accuracy in reading of wind velocities.

The principle of tilting the pendulum progressively, by means of the cam arrangement provides a practical and most desirable type of velocity indicator, the pendulum of which will not unfavorably oscillate during wind gusts, but will be positioned to accurately measure light winds as well as winds of gale velocity.

It is within contemplation of this invention to utilize the velocity indicator separately, say, for instance, as an instrument for gauging flow of liquids or tidal currents. Of course, under such circumstances it might be desirable to indicate the measurements by remote electric control.

Various changes in the shape, size and arrangement of parts may be made to the form of invention herein shown and described without departing from the spirit of the invention or scope of the claims.

I claim:

1. In a wind velocity indicator the combination of a supporting construction, a horizontally rotatable frame mounted upon the supporting construction, a pendulum, means supporting the pendulum for pivoted swinging upon said frame in a position to be actuated by wind pressure, vane means on the frame for positioning the frame so that the pendulum will be in the line of travel of the wind, and means for decreasing the contact area of said pendulum exposed to the wind in proportion to increased velocity of wind travel and to a degree greater than the normal decrease of said area due solely to pendulum swinging.

2. In an instrument for determining velocities of wind, flowing liquids, and the like, the combination of a supporting frame, a pendulum, elongated lever means connected to said frame upon the free swinging end of which is pivotally mounted said pendulum with the major weight of the pendulum lying below the pivot mounting of the pendulum upon said supporting means, and means upon the frame for mechanically causing the general plane of the pendulum to tilt at an angle with respect to the line of its supporting lever means under varying influence of flow velocity of wind or liquid.

3. An indicator as described in claim 2 in which the last mentioned means comprises a cam and means on the pendulum for engaging the cam at a predetermined flow velocity for tilting the pendulum at an angle to the lever means.

4. A wind velocity indicator comprising a supporting frame, a cam sector mounted upon said supporting frame having convexed cam edge, a pendulum body, a supporting lever construction pivoted upon said supporting frame in depending relation therefrom and having at the lower end thereof the pendulum body pivotally connected therewith in a position below the said convexed cam edge, and roller means on the pendulum body normally spaced from the cam edge when the pendulum is hanging limp, the pivot mounting of the pendulum lever means with respect to the arc from which the cam edge is struck being such that the roller means will engage the convexed cam edge as the pendulum body is moved by increasing wind pressure to forwardly tilt the pendulum body at an angle to its pivoted lever construction.

5. A wind velocity indicator comprising a supporting standard, a horizontal rod rotatably mounted upon said standard for rotation in a horizontal plane, a cam bracket construction mounted upon the rod having an arc cam edge, vane means on said rod for facing the rod in the line of wind travel, said cam bracket having a convexed cam surface thereon struck from a predetermined centering, a pendulum body, a supporting lever pivoted upon said bracket, a pendulum body pivotally mounted at the lower end of said lever, a roller upon the pendulum body positioned adjacent to said arc cam edge, the pivot point of said lever being spaced with respect to the centering of the cam edging so that as the pendulum body and its lever are swung under the influence of wind pressure, the roller will engage the cam edge as wind pressure increases for tilting the plane of the pendulum body at an angle with respect to its lever.

6. An indicator as described in claim 5 in which the means which pivotally mounts the pendulum body lever upon said horizontal rod is adjustable to variably space the pivotal mounting of the lever with respect to the cam edge centering and to vary the spacing of the roller means of the pendulum body with respect to the cam edge.

7. A wind velocity indicator comprising a supporting frame, a cam sector mounted upon said supporting frame having a convexly shaped cam edge, a pendulum body, a supporting lever pivoted upon said supporting frame having pivotally connected at the lower end thereof the said pendulum body in a position located below said convex cam edge, cam engaging means on the pendulum body, the pendulum lever pivot being eccentrically spaced with respect to the center of the arc from which the cam edge is struck whereby as the pendulum body and its lever are moved by an increasing wind pressure the cam engaging means will contact the cam edge to tilt the plane of the pendulum body to a greater degree than when the pendulum is normally moved solely under the action of wind pressure whereby to gradually appreciably lessen the surface area exposed to the direction of advancing wind.

8. A wind velocity indicator as described in claim 7 in which the cam sector is mounted upon said frame for bodily rotation in a horizontal plane upon a vertical axis, and in which the frame is provided with vane means at the opposite side of said rotational axis with respect to said sector.

9. In a wind direction indicating instrument the combination of a supporting frame, an elongated frame rotatably mounted upon the supporting frame for rotation in a horizontal plane upon a vertical axis, vane means mounted upon said elongated frame at a location spaced from the axis of rotation of said elongated frame, a rotary wheel mounted upon said elongated frame for rotation on a horizontal axis at a location spaced from the vertical axis upon which the said elongated frame rotates, wind direction indicating symbols designating north, east, south and west, located in planes which lie at right angles to the plane of rotation of said wheel and are visible from a line of vision in the plane of the wheel.

References Cited in the file of this patent
UNITED STATES PATENTS

| | | |
|---|---|---|
| 315,261 | Edwards | Apr. 7, 1885 |
| 477,551 | Kerr | June 21, 1892 |
| 1,332,810 | Danielson | Mar. 2, 1920 |
| 1,708,036 | Stenbol | Apr. 9, 1929 |
| 2,254,242 | Righi | Sept. 2, 1941 |
| 2,539,788 | Matcovich | Jan. 30, 1951 |
| 2,600,309 | MacDonald | June 10, 1952 |
| 2,630,711 | Kahl | Mar. 10, 1953 |